(12) United States Patent
Roberts, III et al.

(10) Patent No.: US 8,715,435 B2
(45) Date of Patent: May 6, 2014

(54) METHOD FOR MODIFYING COMPOSITE ARTICLES

(75) Inventors: Herbert Chidsey Roberts, III, Simpsonville, SC (US); Paul Edward Gray, North East, MD (US); Roger Lee Ken Matsumoto, Newark, DE (US); Jeffrey H. Boy, Wilmington, DE (US); Philip Harold Monaghan, Hockessin, DE (US); Joseph Halada, Newark, DE (US)

(73) Assignee: General Electric Company, Schenectady, NY (US)

( * ) Notice: Subject to any disclaimer, the term of this patent is extended or adjusted under 35 U.S.C. 154(b) by 345 days.

(21) Appl. No.: 13/228,927

(22) Filed: Sep. 9, 2011

(65) Prior Publication Data

US 2013/0062000 A1   Mar. 14, 2013

(51) Int. Cl.
*B32B 37/00* (2006.01)
*B29C 65/06* (2006.01)

(52) U.S. Cl.
CPC ............. *B29C 65/0672* (2013.01); *B29C 65/06* (2013.01)
USPC ............................ 156/73.5; 156/293; 156/297

(58) Field of Classification Search
CPC ............................ B29C 65/06; B29C 65/0672
USPC .......... 156/73.5, 293, 297, 298, 308.2, 309.6; 264/68, 69
See application file for complete search history.

(56) References Cited

U.S. PATENT DOCUMENTS

| | | | |
|---|---|---|---|
| 3,414,963 A | 12/1968 | Cheng | |
| 3,820,231 A | 6/1974 | Sage | |
| 4,387,844 A | 6/1983 | Frank | |
| 4,468,299 A | 8/1984 | Byrne et al. | |
| 5,188,279 A | 2/1993 | Joyce et al. | |
| 6,138,896 A | 10/2000 | Ablett et al. | |
| 6,153,035 A * | 11/2000 | Van Laeken | 264/68 |
| 6,820,334 B2 | 11/2004 | Kebbede et al. | |
| 7,341,431 B2 | 3/2008 | Trewiler et al. | |
| 2010/0163211 A1 | 7/2010 | Nelson et al. | |
| 2011/0206898 A1* | 8/2011 | Hayslip | 428/131 |

FOREIGN PATENT DOCUMENTS

| | | |
|---|---|---|
| EP | 1920869 A1 | 5/2008 |
| GB | 2173467 A | 10/1986 |

OTHER PUBLICATIONS

Search Report and Written Opinion from EP Application No. 12182707.5 dated Dec. 17, 2012.

\* cited by examiner

*Primary Examiner* — James Sells
(74) *Attorney, Agent, or Firm* — Dority & Manning, PA

(57) ABSTRACT

In certain embodiments of the present disclosure a method for modifying a composite article is described. The method includes positioning a plug made from composite material at a site on the composite article. The method further includes rotating at least one of the plug and the article at a rate of speed sufficient to form an inertia bond between the plug and the site of the composite article. The plug and the site are engaged to effect an inertia bond therebetween.

12 Claims, 2 Drawing Sheets

METHOD FOR MODIFYING COMPOSITE ARTICLES

FIELD OF THE INVENTION

The present invention generally involves a method of modifying composite articles. In particular embodiments, inertia bonding can be utilized to modify such composite articles.

BACKGROUND OF THE INVENTION

Reinforced ceramic matrix composites having fibers dispersed in continuous ceramic matrices of the same or a different composition are well suited for structural applications because of their toughness, thermal resistance, high-temperature strength, and chemical stability. Such composites typically have high strength-to-weight ratio that renders them attractive in applications in which weight is a concern, such as in aeronautic applications. Their stability at high temperatures renders them very suitable in applications in which the components are in contact with a high-temperature gas, such as in gas turbine engine.

Ceramic matrix composites are quite expensive because their typical production process is rather involved. Therefore, it is desirable to have a method of modifying such pieces, which may be damaged either accidentally or during use, such that they may be salvaged or their useful life may be extended.

Conventionally, damage to composites is repaired with externally bonded patches, which rely solely on bonding to the outer surface of the composite article. Unfortunately, these types of modifications do not engage enough of the base of the composite article to form a significant bond to the patch. Other methods of modification utilize a rivet or outer and inner plug halves which are joined together to create a floating patch that, again, does not directly bond to the composite article.

Thus, a need exists for improved methods for modifying a composite article.

BRIEF DESCRIPTION OF THE INVENTION

Aspects and advantages of the invention are set forth below in the following description, or may be obvious from the description, or may be learned through practice of the invention.

In certain embodiments of the present disclosure a method for modifying a composite article is described. The method includes positioning a plug made from composite material at a site on the composite article. The method further includes rotating at least one of the plug and the article at a rate of speed sufficient to form an inertia bond between the plug and the site of the composite article. The plug and the site are engaged to effect an inertia bond therebetween.

In other embodiments of the present disclosure, a method for modifying an area of a composite article is described. The method includes positioning a plug made from a fiber-reinforced ceramic matrix composite at a site on the composite article. The composite article includes a fiber-reinforced ceramic matrix composite. The method further includes rotating at least one of the plug and the article at a rate of speed sufficient to form an inertia bond between the plug and the site of the composite article. The plug and the site are engaged to effect an inertia bond therebetween.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
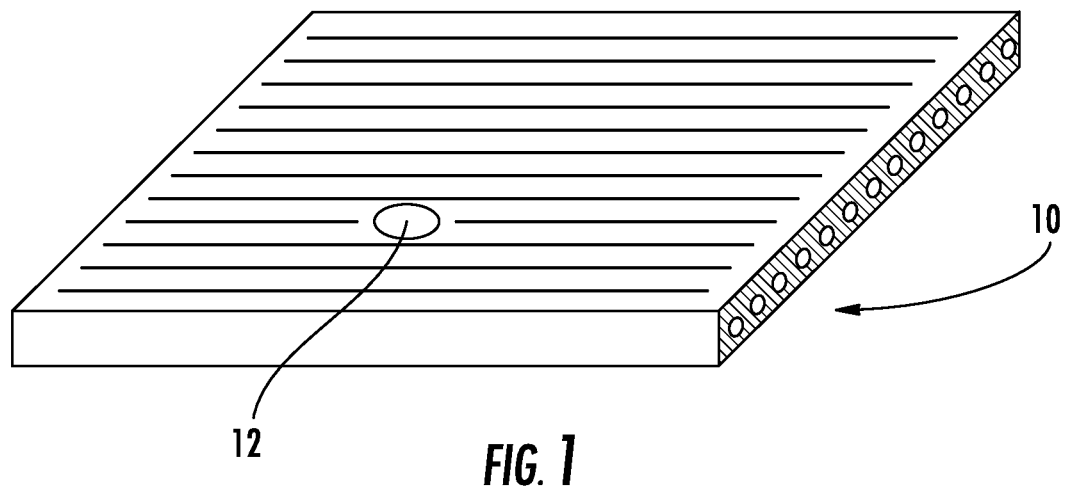
FIG. 1 is a perspective view of a composite article in accordance with certain embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Ceramic matrix composites have been used in forming components exposed to hot combustion gas in aircraft engines and gas turbines, such as shrouds, combustor liners, nozzles, buckets, blades, and vanes. An important characteristic of ceramic matrix composites that favors their use in these applications is their high toughness behavior which is characterized by a rising stress-strain curve after the initial matrix cracking in the material.

In service, gas turbine components operate at temperatures frequently exceeding 1200° C. and are subjected to significant temperature gradients. In addition, these components are exposed to impact loading from particles having high velocity that are entrained in the hot gases. The methods of the present disclosure for modifying damages in gas turbine engine components made of composites, such as ceramic matrix composites, can extend the life of these components. In addition, the methods of the present disclosure can modify newly-manufactured components and, thus, reduce the number of off-specification components. The methods of the present disclosure provide modified components that exhibit toughness behavior similar to newly-manufactured components.

Very generally, the methods of the present disclosure utilize inertia bonding to modify composites. Advantageously, composite elements can be modified without having to be disassembled or preheated prior to modification.

In certain embodiments, the composite elements are fiber-reinforced ceramic matrix composites. In certain embodiments, the fibers comprise silicon carbide. Reference herein to fibers of silicon carbide includes single-crystal or polycrystalline fibers, or wherein silicon carbide envelops a core of another material, such as carbon or tungsten. The fibers may also comprise organic precursors that will be transformed into silicon carbide at a temperature within the range of temperatures experienced during the fabrication process. Such fibers may also include elements other than silicon and carbon.

The modification method of the present disclosure is applicable for the modification of articles of composite material that are made by any method of composite production, including methods of ceramic matrix composite production. For example, a ceramic matrix composite article can be made by the pre-impregnated/melt infiltration, pre-impregnated/chemical-vapor infiltration, slurry cast, slurry cast/melt infiltration, slurry cast/chemical-vapor infiltration, polymer infiltration and pyrolysis, or combinations thereof.

For example, in the pre-impregnated/melt infiltration method, ceramic composites articles are formed which comprise a porous fiber preform comprising ceramic fibers and matrix material (together, a "fiber preform") and an infiltrant. Typically, the ceramic fibers form a network of reinforcement bodies for the composite and are surrounded by the matrix and the infiltrant. The ceramic fiber preform is porous because although some matrix or matrix precursor material may have been provided with the fibers, there still is space between the fibers (inter-fibrillar spaces or regions). These inter-fibrillar regions are filled with an infiltrant in the process of producing the ceramic composite. The infiltrant can also react with matrix precursors. Generally, the fibers range from about 0.3 micron to about 150 microns in diameter, and about 100 m or longer in length. The fibers can be used as a continuous filament or as discontinuous fibers, which frequently have an aspect ratio of at least 10 and as high as 1000 or more. The shaped fiber preform may be made by a number of manners. In addition to preforms made with continuous fibers, low aspect-ratio fibers may be mixed with a particulates of ceramic matrix material or ceramic matrix precursor material and a binder, such as an organic resin, a cellulosic material, or a combination thereof, and formed into a desired shape.

The mixture can be formed or shaped into a preform or compact by a number of known techniques. For example, it can be extruded, injection molded, die-pressed, isostatically pressed, or slip cast to produce the preform of desired shape and size. Preferably, the preform is of the shape and size of the finished composite article.

Alternatively, the fiber is continuous and as long as desired. Continuous fibers impregnated with a suspension comprising the matrix or matrix precursor material can be filament-wound around a stable formed support to build the preform having desired shape and thickness. Such impregnated continuous fibers may also be formed first into pre-impregnated sheets or tapes by placing long lengths of fibers next to and parallel to one another. Such pre-impregnated sheets or tapes can consist of single or multiple layers of filaments. Continuous filaments can also be woven, braided, or otherwise arrayed into desired configurations. Portions of the fiber sheets or tapes may be disposed around the stable formed support to build up a fiber preform having desired shape and thickness. When the composite desirably has a continuous SiC matrix, an organic resin or carbon particles may be introduced into the fiber tows before they are made into pre-impregnated tapes and formed into shape. As used herein, the term "carbon particles" or "carbon particulates" includes, but is not limited to, particles, flakes, whiskers, or fibers of amorphous, single crystal, polycrystalline carbon, graphite, carbonized plant fibers, lamp black, finely divided coal, charcoal, and carbonized polymer fibers or felt such as rayon, polyacrylonitrile, and polyacetylene.

The fibers may be advantageously coated with a compound that renders them unreactive toward one or more of the molten precursors of the ceramic matrix materials. In one aspect of the present disclosure, the fibers are SiC fibers coated with a nitride coating, such as boron nitride or silicon-doped boron nitride. Other coating materials can be metal nitrides, such as aluminum nitride or silicon nitride, chosen for the particular application. The coating can prevent a substantial degradation of the fibers when they must be exposed to the molten precursors of the ceramic matrix materials for an extended period of time. Coatings may also be applied to impart a superior debonding characteristic of the fibers in the final composite under severe stress conditions. The nitride coating can be deposited by methods well known in the art for depositing a continuous coating without damaging the fiber. Coating processes such as chemical vapor deposition or physical vapor deposition processes, such as sputtering, are suitable. Generally the chemical vapor deposition of the nitride compound is carried out at temperatures ranging from about 900° C. to about 1800° C. in a partial vacuum with the particular processing conditions being known in the art or determinable empirically. The nitride coating is at least sufficiently thick to be continuous and free of significant porosity. Coating thickness can range from about 0.1 micron to about 5 microns, and typically it is about 1 micron for fibers of about 8 to 15 microns in diameter. The coating thickness should be sufficient to prevent reaction, or prevent significant reaction, between the fibers and the infiltrating precursors of the ceramic matrix materials under the particular processing conditions used. In the case of a composite of SiC fibers in a SiC matrix, the precursor of the ceramic matrix material is typically silicon. During the infiltration process, the nitride coating may or may not react with or dissolve in the molten silicon depending on the time and temperature; i.e., the nitride coating will survive better at lower temperatures and for shorter times of infiltration. Generally, silicon infiltration time increases with the size of the preform. Therefore, larger-sized preforms may require thicker nitride coatings. The reinforcement fibers may be coated with more than one coating, each comprising a different material. Alternatively, the coating composition may be graded continuously across the thickness of the coating. Such a graded coating can be made by varying the composition of the reactants during the deposition.

Optionally, the nitride-coated fibers can be coated with a second continuous coating selected from the group consisting of carbon and metals that react with silicon to form a silicide, metal carbide, metal silicide, metal nitride, and metal boride, on the nitride coating. The metal carbide may be a carbide of silicon, tantalum, titanium, or tungsten. The metal silicide may be a silicide of chromium, molybdenum, tantalum, titanium, tungsten, or zirconium. The nitride may be a nitride of silicon, aluminum, titanium, zirconium, hafnium, niobium, tantalum, or boron. The metal boride may be a diboride of titanium, zirconium, halfnium, or aluminum.

The outer coating of the fibers can promote wetting to improve the infiltration by capillarity, provide a desirable debonding with the matrix, or reduce the reaction between the matrix and the fiber during high temperature service. Moreover, the fibers may also be coated with a material that renders them readily wettable by the molten precursor of the ceramic matrix material.

A ceramic matrix material or a precursor thereof is applied directly or indirectly to the surface of the fiber preform. An indirect application may be effected by a wicking action. When the ceramic composite comprises a SiC continuous phase, the precursor is silicon. For example, silicon powder may be applied directly on the surface of the fiber preform. Alternatively, molten silicon may be supplied to the surface of the fiber preform by a wicking action. The fiber preform with the ceramic matrix material or the precursor thereof is heated to a temperature greater than or equal to the melting point of the precursor of the ceramic matrix material in a vacuum, for example in a closed furnace. Preferably, the furnace is evacuated before the heating begins to avoid the entrapment of pockets of gas within the fiber preform. A vacuum in a range from about 1 Pa to about 300 Pa is typically adequate. Preferably, the vacuum is in a range from about 2 Pa to about 150 Pa.

Preferably, the furnace used for the infiltration process is a carbon furnace; i.e., a furnace the interior of which is constructed essentially from elemental carbon. Such a furnace reacts with any residual oxygen in the furnace atmosphere to produce CO or $CO_2$ that does not substantially react with the carbon support, the fiber preform, or the precursor of the ceramic matrix material. When a carbon furnace is not used, it is preferable to have a quantity of carbon disposed within the interior of the furnace so that it can react with any residual oxygen in the furnace atmosphere.

Infiltration is performed at greater than or equal to the melting point of the precursor of the ceramic matrix material. In the case of silicon, the infiltration temperature is in a range from about 1400° C. to about 1600° C., preferably from about 1415° C. to about 1500° C., more preferably from about 1425° C. to about 1450° C. Higher temperatures lower the viscosity of molten silicon and promote a better diffusion of the molten silicon into the fiber preform, but they can unnecessarily accelerate a degradation of the fibers.

Composite articles that can be modified by the methods of the present disclosure can also be made by other processes. For example, such composite articles can be made by the slurry casting method. Sheets of reinforcement fibers, which may be formed by weaving or braiding the fibers, are laid up to form a body. The fibers may be coated by a method such as chemical-vapor infiltration. The body is placed in a mold, which is then filled with a slurry comprising particulate ceramic matrix material, ceramic matrix precursor material, or mixture thereof to form a preform. The preform is subsequently densified by melt infiltration or chemical vapor infiltration to form the final composite article.

Ceramic composite articles such as combustion chamber liners, combination combustor liners and transition pieces, nozzles, shroud rings, vanes, buckets, and blades can be made using the method of manufacturing described above. Damages in these ceramic composite articles can be modified by the methods of the present disclosure.

The modification methods of the present disclosure utilize inertia bonding to modify composite articles. In particular, a plug is bonded to a mating hole in the composite structure through inertia bonding to effect such a modification. In inertia bonding, a first workpiece is rotated to a specific speed and then a second workpiece is forced into frictional engagement with the first workpiece with frictional heat being generated to join together the two components without melting in the contact region. In cases where the matrix material has a high flow rate when melted, as in silicon frequently used in ceramic matrix composites, the modification process can introduce more damage if the matrix material is over heated and the matrix material flows rapidly away from the desired bond location. Utilization of inertia bonding allows for modification of a composite article while effectively controlling the local temperature at the matrix modification zone.

Inertia welding is a known process used to join metallic components but has heretofore not been utilized for modification of composite articles in the manner described herein. A typical inertia welding machine includes first and second opposed heads to which first and second workpieces may be fixedly attached in opposition to each other. The first head is rotatable and is powered by a suitable motor for rotating the head and first workpiece to a precise rotational speed. The second head is non-rotatable and simply supports the second workpiece. The first head includes one or more flywheels to provide the rotary inertia for effecting welding of the two workpieces. The second head is axially translatable by a powered piston which engages together the first and second workpieces under a substantial compressive weld load. The second workpiece therefore frictionally engages and brakes the rotating first workpiece creating friction heating at the contact area therebetween which raises the temperature thereof to effect an inertia weld without melting.

There are only four control variables in inertia welding. These include the workpiece geometry such as size and configuration; the applied weld load and corresponding weld stress at the contact area of the two engaged workpieces; the initial contact speed of the two workpieces typically represented as the surface velocity at the contact area which is based on the rotary speed and radius at the contact area; and, lastly, the unit energy input at the contact area based on the mass moment of inertia of the flywheel typically represented by a flywheel function which is the product of the flywheel weight and the square of the radius of gyration.

In accordance with the present disclosure, such a conventional inertial welding configuration can be utilized to modify a composite article with inertia bonding as further described herein. Referring to FIG. 1, a damaged composite article 10 is illustrated with an area of damage 12. The area of damage can be advantageously cleaned by a mechanical or a chemical method before the inertial bonding takes place. For example, the damaged area may be abraded by a mechanical action. Alternatively, in embodiments where the composite article is a ceramic matrix composite, the article can be treated in a reducing atmosphere to remove surface oxides from the surfaces of the ceramic matrix composite article. Such a reducing atmosphere can include a gas such as hydrogen, carbon monoxide, or mixtures of one of these gases with an inert gas (for example, nitrogen, argon, or helium). These cleaning actions can promote subsequent joining of materials therebetween.

In certain embodiments of the present disclosure, material around the damage area is removed to form a depression in which a plug having appropriate shape, size, and composition can be positioned. The depression may take one of several different forms, such as cylinder, inverted prism, inverted cone, or inverted truncated cone. In embodiments in which the composite is a ceramic matrix composite, preferably the depression has the shape of an inverted prism or cone so that there is an overlap between load-carrying fibers in the original ceramic matrix composite article and the plug.

Figure 2:
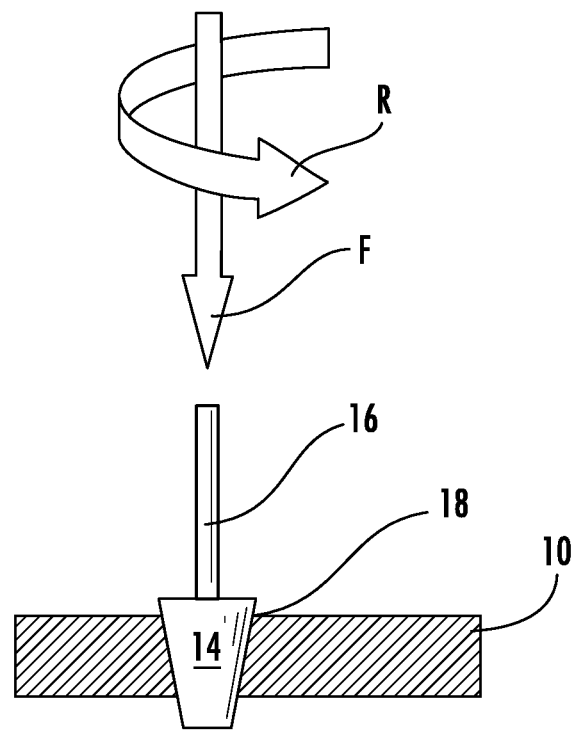
FIG. 2 is a cross-sectional schematic view of the composite article in FIG. 1 being modified in accordance with certain aspects of the present disclosure.

Referring to FIG. 2, a plug 14 is joined to a shaft 16. The plug 14 is typically formed with a complimentary material to the composite article being modified and the material to form such a plug can include any of the aforementioned materials which are utilized to form a composite article. The shaft diameter is smaller than the plug diameter. The shaft 16 can be operatively joined to a suitable motor (not shown), such as a hydraulic motor, for being rotated during operation at a suitable rotary speed. One or more flywheels (not shown) can also be joined to the shaft 16 to control the rotary mass moment of inertia of the shaft for effecting inertia bonding energy.

Plug 14 can be rotated at a high rate of rotational speed as would be necessary to form an inertia bond between the plug and the composite article. Contact speed can be expressed in surface feet per minute (SFM) and can be from about 100 to about 1000 SFM to allow for creation of an inertia bond. Shaft 16 can also be joined to a piston (not shown), such as a hydraulic piston which is configured for pressing plug 14 into engagement with modification site 18 of composite article 10. When plug 14 is pressed into engagement with the modification site 18, the high rotational speed R and normal pressure of the vertical driving force F generates a heating effect to locally heat and bond the plug to the composite article at the modification site.

Figure 3:
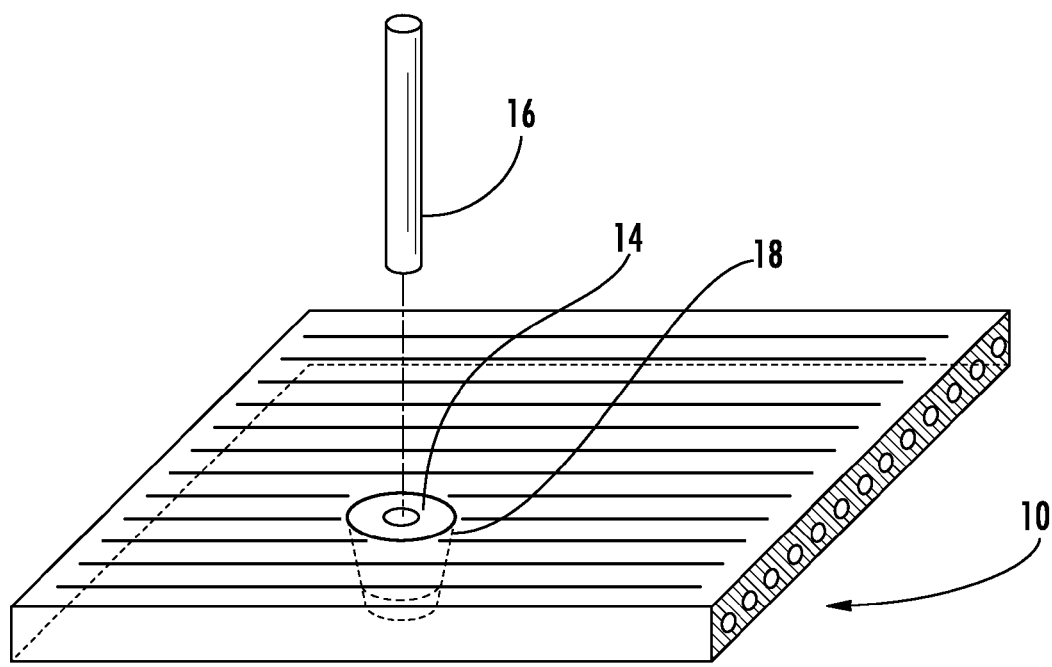
FIG. 3 is a perspective view of a composite article in accordance with certain embodiments of the present disclosure.

The speed of the rapid heating and cooling of the modification can prevent distortions in the composite article that would otherwise occur if the entirety of the composite article was heated to the necessary matrix bonding temperature. Referring to FIG. 3, once the matrix of the composite article 10 bonds to the plug 14, the rotational energy of the plug 14 transfers to the smaller diameter of the shaft 16 and the energy shears the shaft 16 from the plug 14 thereby preventing any disturbing influences at the modification site 18 once the matrix of the composite article 10 forms a bond with the plug 14.

The modification methods described herein can be utilized to modify both thin and thick walled composite articles. Importantly, depending on the modification region, the composite article can be modified by the methods described herein without the need for being disassembled or preheated prior to modification.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A method for modifying a composite article, comprising:
    positioning a plug comprising composite material at a site on the composite article, wherein the composite article comprises a first fiber-reinforced ceramic matrix composite that includes a plurality of first fibers, the first fibers comprising silicon carbide, and wherein the plug comprises a second fiber-reinforced ceramic matrix composite that includes a plurality of second fibers, the second fibers comprising silicon carbide;
    providing a shaft joined to the plug, the shaft having a diameter smaller than the diameter of the plug;
    rotating at least one of the plug and the article at a rate of speed sufficient to form an inertia bond between the plug and the site of the composite article;
    engaging the plug and the site to effect an inertia bond therebetween;
    wherein after the inertia bond is formed, transferring the rotational energy of the plug or the article to the smaller diameter of the shaft to shear the shaft from the plug.

2. A method as in claim 1, further comprising creating a depression at the site to accept the plug.

3. A method as in claim 2, wherein the depression can accommodate a conical shape.

4. A method as in claim 2, wherein the depression can accommodate a prism shape.

5. A method as in claim 3, wherein the plug comprises a conical shape.

6. A method as in claim 1, further comprising cleaning the site prior to positioning a plug comprising composite material at the site.

7. A method as in claim 1, further comprising removing a portion of the composite article from the site.

8. A method as in claim 1, wherein the composite article comprises a combustion chamber liner, nozzle, shroud ring, vane, bucket, or blade.

9. A method for modifying an area of a composite article, comprising:
    positioning a plug comprising a first fiber-reinforced ceramic matrix composite at a site on the composite article, the composite article comprising a second fiber-reinforced ceramic matrix composite, wherein at least one of the first fiber-reinforced ceramic matrix composite and the second fiber-reinforced ceramic matrix composite comprises organic precursors transformable into SiC;
    providing a shaft joined to the plug, the shaft having a diameter smaller than the diameter of the plug;
    rotating at least one of the plug and the article at a rate of speed sufficient to form an inertia bond between the plug and the site of the composite article;
    engaging the plug and the site to effect an inertia bond therebetween; and
    wherein after the inertia bond is formed, transferring the rotational energy of the plug or the article to the smaller diameter of the shaft to shear the shaft from the plug.

10. A method as in claim 9, further comprising creating a depression at the site to accept the plug.

11. A method as in claim 10, wherein the depression can accommodate a conical shape.

12. The method as in claim 1, wherein at least one of the first fibers and the second fibers comprise organic precursors that are transformable into SiC.

* * * * *